(12) United States Patent
Schumacher et al.

(10) Patent No.: US 6,655,120 B2
(45) Date of Patent: Dec. 2, 2003

(54) CROP LIFTER FOR REAPING SYSTEMS OF HARVESTING MACHINES

(75) Inventors: Gustav Schumacher, Eichelhardt (DE); Friedrich-Wilhelm Schumacher, Eichelhardt (DE)

(73) Assignee: Gebr. Schumacher (DE)

( * ) Notice: Subject to any disclaimer, the term of this patent is extended or adjusted under 35 U.S.C. 154(b) by 0 days.

(21) Appl. No.: 10/098,701

(22) Filed: Mar. 15, 2002

(65) Prior Publication Data

US 2002/0148212 A1 Oct. 17, 2002

(30) Foreign Application Priority Data

Mar. 15, 2002 (DE) .......................................... 101 13 107

(51) Int. Cl.[7] .............................................. A01D 34/24
(52) U.S. Cl. ...................................................... 56/312
(58) Field of Search ........................ 56/119, 94, 121.42, 56/126, 219, 312, 313, 99

(56) References Cited

U.S. PATENT DOCUMENTS

| | | | | |
|---|---|---|---|---|
| 1,862,775 A | * | 6/1932 | Thoen ........................... | 56/313 |
| 2,141,299 A | * | 12/1938 | Hume et al. ................... | 56/313 |
| 2,394,838 A | * | 2/1946 | Beltz ............................. | 56/312 |
| 2,484,704 A | * | 10/1949 | Girodat ......................... | 56/312 |
| 2,576,122 A | * | 11/1951 | Kenison ........................ | 56/312 |
| 2,577,324 A | * | 12/1951 | Goesch ......................... | 56/312 |
| 2,734,332 A | * | 2/1956 | Fisher ........................... | 56/312 |
| 3,313,095 A | * | 4/1967 | Gaterman ..................... | 56/312 |
| 3,579,967 A | * | 5/1971 | Schumacher .................. | 56/313 |
| 3,633,350 A | * | 1/1972 | Schumacher .................. | 56/313 |
| 3,821,877 A | * | 7/1974 | Weinheimer .................. | 56/312 |
| 3,834,139 A | * | 9/1974 | Schumacher et al. ......... | 56/313 |
| 4,120,138 A | * | 10/1978 | Schumacher et al. ......... | 56/313 |
| 4,704,850 A | * | 11/1987 | Obermeier ..................... | 56/119 |
| 5,005,346 A | * | 4/1991 | Medernach .................... | 56/312 |
| 5,906,091 A | * | 5/1999 | Gemar .......................... | 56/119 |
| 6,244,026 B1 | * | 6/2001 | Minnihan et al. ............. | 56/119 |
| 6,442,919 B1 | * | 9/2002 | Schumacher et al. ......... | 56/307 |

FOREIGN PATENT DOCUMENTS

| | | | |
|---|---|---|---|
| DD | 0132751 | * | 8/1977 |
| DE | 43 23 053 A1 | | 1/1995 |
| FR | 451123 | * | 11/1912 |

* cited by examiner

Primary Examiner—Robert E. Pezzuto
Assistant Examiner—Nathan Mammen
(74) Attorney, Agent, or Firm—Harness, Dickey & Pierce, P.L.C.

(57) ABSTRACT

A crop lifter for a harvesting machine reaping system with a bed plate (1) and projecting reaping fingers (2) has an elastically bendable support bar (5) with a first end (6) and a second end (7). The first end (6) is adapted to be retained on the bed plate (1). A grain lifter is connected to the second end (7) of the support bar (5). A holder (10), which has legs (15, 16), projects from the face of the support bar (5) facing the grain lifter (8). The holder (10) is adapted to receive the reaping finger (2) between the legs (15, 16). A holding mechanism is adapted to support the reaping finger (2) in a direction towards the support bar (5). The support bar (5) includes an area with a bend (13), which opposes the portion adapted to receive the reaping finger (2) taken up by the holder (10). The portions (18, 19) on both sides of the bend 13 enclose an angle opening towards the grain lifter (8).

13 Claims, 4 Drawing Sheets

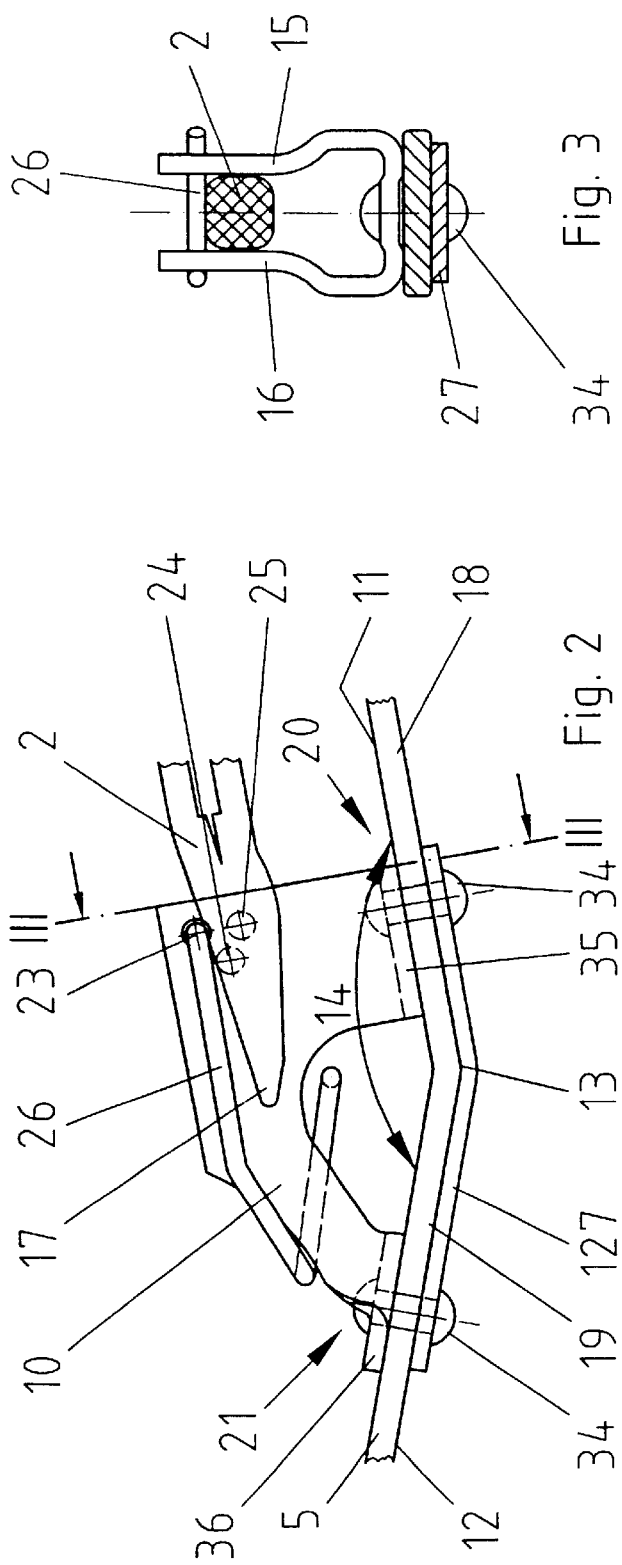

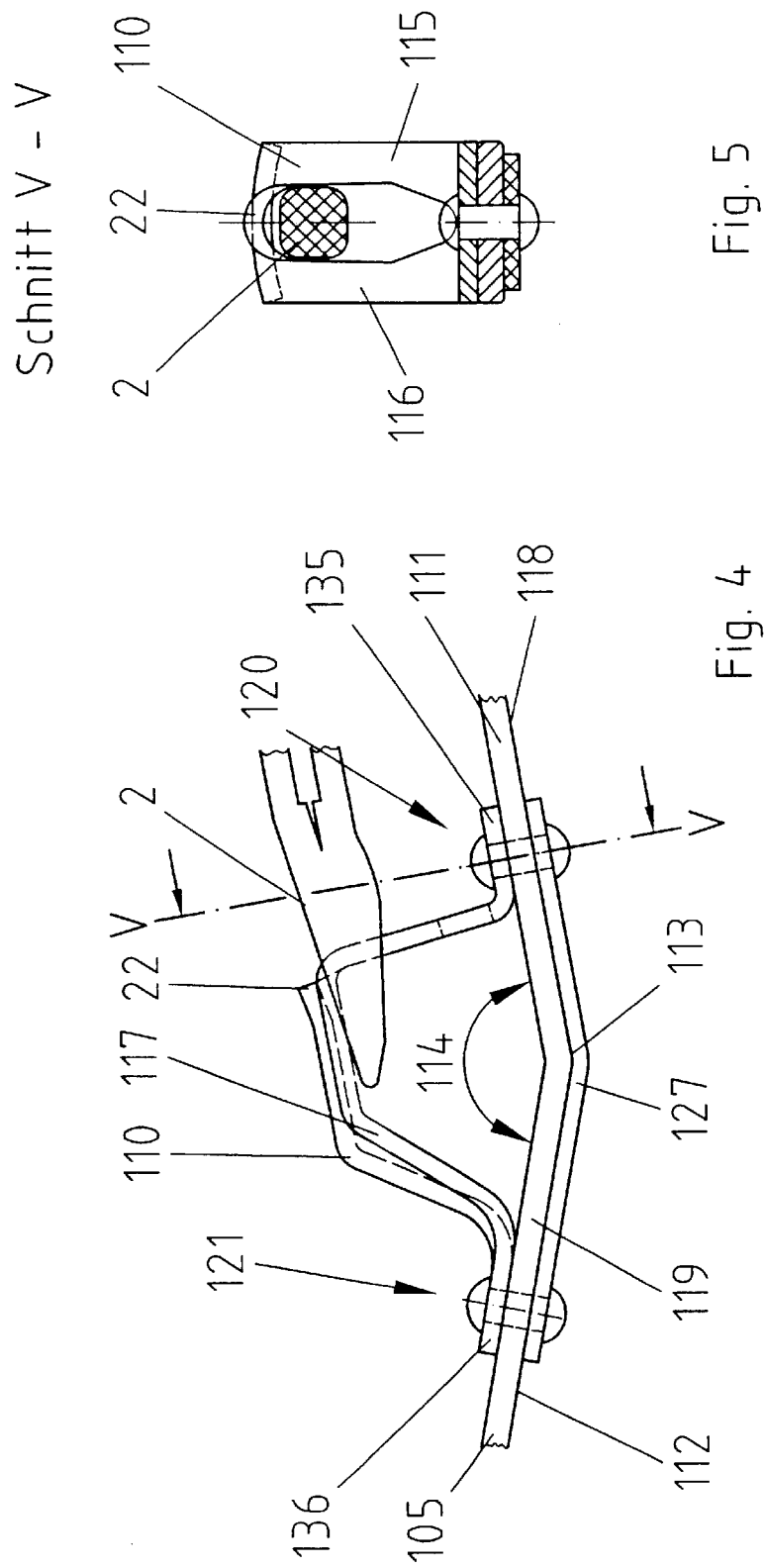

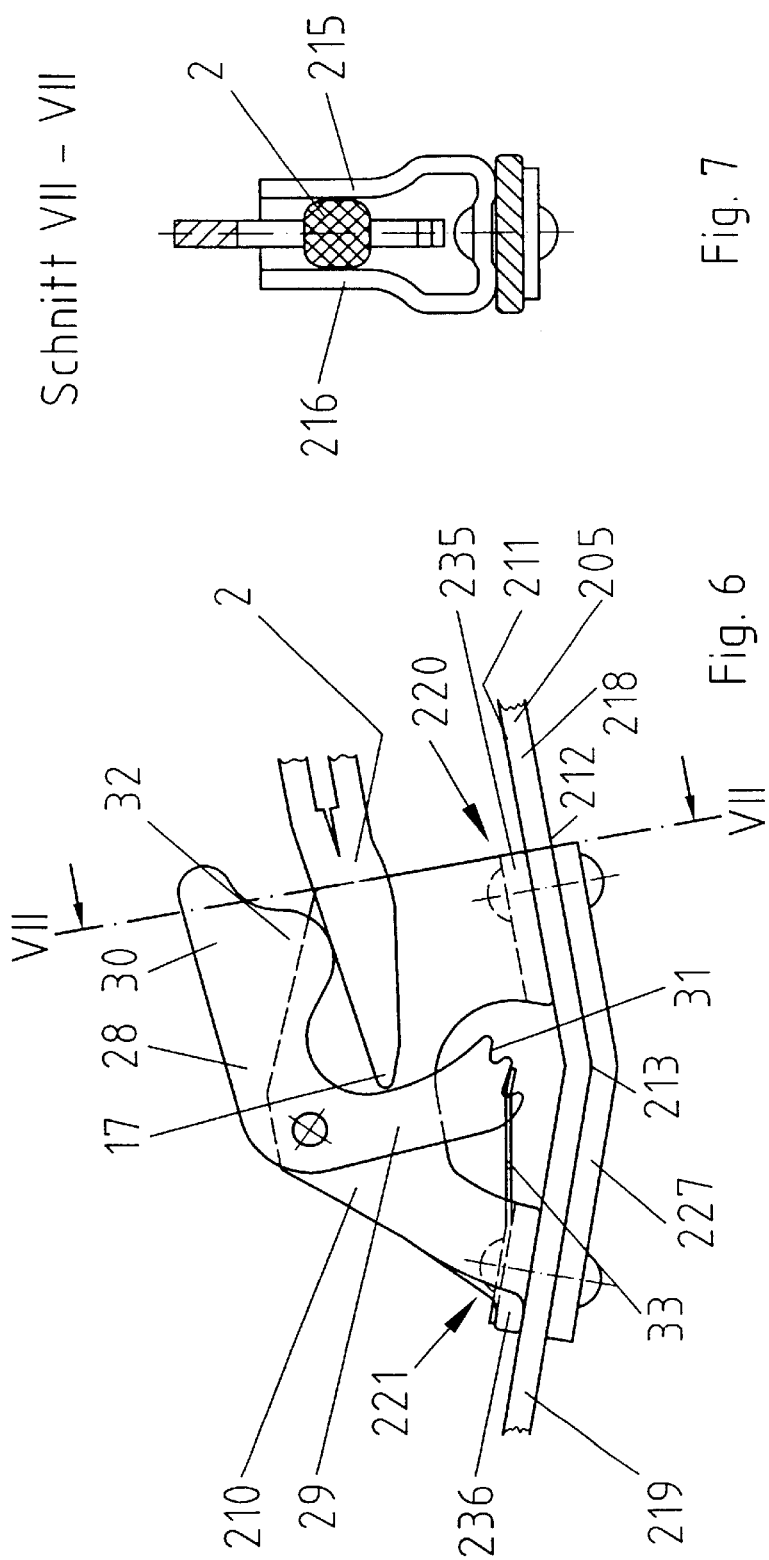

CROP LIFTER FOR REAPING SYSTEMS OF HARVESTING MACHINES

CROSS-REFERENCE TO RELATED APPLICATIONS

This application claims priority to German Patent Application No. 10113107.0 filed Mar. 15, 2001, which application is herein expressly incorporated by reference.

FIELD OF THE INVENTION

The invention relates to a crop lifter for harvesting machine reaping systems which have a bed plate with attached projectingly reaping fingers.

BACKGROUND OF THE INVENTION

In known reaping systems for harvesting machines, the reaping fingers are distributed along the bed plate. The reaping fingers guide a cutter bar and form the counter cutting edge for the cutting edges of the reaping blades which are attached to the reciprocating cutter bar. In order to reap bent or lying cereals, crop lifters are used to lift the cereal. These crop lifters have a support bar with its first end retained on the bed plate. Also, the support bar is supported via a holder and holding means attached on the tip of the reaping finger. The second end of the support bar is connected to a grain lifter. The grain lifter is arranged at an angle relative to the support bar. The holder holds the crop lifter parallel to the driving direction of the harvesting machine. The support bar is made of spring steel so that the crop lifter tip, formed by the connection area of the grain lifter with the support bar, can be guided along uneven ground. Accordingly, the holder moves relative to the tip of the reaping finger. The holder itself is riveted to the support bar. Such a crop lifter is described in DE 43 23 053 A1.

Generally, the holders are formed such that they enclose and cover the reaping finger tip. Also, the holders are angled in the area in front of the tip of the reaping finger so that the harvesting crop, which is between the grain lifter and the support bar, can be transported to the back of the one finger. The holders enable a vertical movement relative to the rigid reaping finger. Thus, the holder cannot be too short, but must be connected either over the whole length of the fingers to the support bar, but at least at two attachment positions, which are off-set along the support bar. The reaping fingers of modern harvesting machine reaping systems, for example combine harvesters, are inclined in their working position in a range of 12° to 18° downwards to the ground. This achieves a corresponding gap to the ground for the cutting tool tray which follows opposite the direction of movement of the harvesting machine in the reaping operation. The gap enables a sufficiently low mowing operation. For the same reason, the support bar of the crop lifter is also inclined to the ground in the mounted condition. This orientation, however, creates an enlarged distance between the ground and the fingers. Accordingly, when harvesting crops, for example pulse crops, which include pods that hang very low, in contrast to grains, the reaping fingers are not moved sufficiently low enough and unacceptable harvesting losses occur.

SUMMARY OF THE INVENTION

An object of the invention is to provide a crop lifter which achieves a closer approximation of the tips of the reaping finger to the ground. Accordingly, a sufficiently close mowing to the ground occurs.

According to the invention, a crop lifter for a reaping system is provided to be attached to a bed plate with projecting reaping fingers. An elastically bendable support bar has a first end and a second end. The first end is adapted to be secured on the bed plate. A grain lifter is connected to the second end of the support bar. A holder has legs projecting from the face of the support bar facing to the grain lifter. The legs take up the reaping finger between the support bar and the holder. The legs are arranged to a holding means, which supports the support bar on the reaping finger, in a direction toward the support bar. The support bar includes a bend in an area opposing the portion of the reaping finger inserted into the holder. Thus, the portions on both sides of the bend enclose an obtuse angle opening towards the grain lifter.

The support bar can extend at a distance from the bed plate which approximately corresponds to one of the tips of the reaping fingers in a more or less parallel direction to the ground. In such an arrangement, the bed plate with the cutter bar and the reaping finger can mow up-to 40 mm closer to the ground. Thus, the losses of difficult harvesting crops, such as pulse crops or lower lying grains, can be minimized. The bend arrangement in the proposed area according to the invention, has the advantage compared to an arrangement where the bend is between the holder and the first end of the support bar, that the holder can be directed essentially parallel to the tip of the reaping finger. Otherwise an immense travel of the spring of the support bar would get lost. The largest possible vertical movement of the support bar, with reference to the tip of the reaping finger, is important for the travel of the spring at the second end of the support bar where the grain lifter is connected in order to balance as large as possible ground unevennesses.

In the embodiment according to DE 43 23 053 A1, a crop lifter is illustrated with a support bar. The support bar at its first end, in the area of engagement with the tip of the reaping finger, is bent upwards and is provided with an opening. The opening enables the engagement of the tip of the reaping finger. This opening in the support bar, leads to a weakening of the support bar, especially at a position where, when sprung on uneven ground, the largest loads act. If the bend is displaced in the direction towards the second end, between the second end and the holder, lowering is limited, and thus unacceptable losses occur. Also the danger exists when a low set reaping system enters the ground that the rivets or screws are ground off on stony or sandy ground. Accordingly, the connection is destroyed. Thus, the crop lifter is pushed sideways and ripped off. This can lead to damage of the reaping system and also to following devices, for example a combine harvester. According to the bend arrangement of the invention an advantageous position is selected. Thus, an advantageous reaping positioning may be achieved. Also, with respect to unevennesses, a sufficiently large travel of the spring is achieved with acceptable wear.

In an embodiment of the invention, the bend is provided in the extension range of the holder along the support bar. Accordingly, the overlapping of the tip of the reaping finger necessary for transport of the harvesting crop is achieved. The holder is preferably connected to the support bar at two attachment positions off-set along the length of the support bar. The bend is arranged between the two attachment positions.

In order to influence the orientation of the second end of the support bar and the grain lifter, the holding means is arranged with respect to the holder to enable support on the reaping finger at different positions of approximation to the support finger. Alternatively it is possible, for application cases, where only one orientation is necessary, to provide the holding means as a bridge portion rigidly connecting the legs of the holder. An adjustable arrangement of the holding means can be achieved by providing pairs of bores, arranged in the legs at different distances to the support bar. A pin is insertable into the bores of the pairs of bores. Alternatively it is possible, to provide the holding means as an elbow lever, pivotably supported between the legs. A first lever arm is provided with notches and a second lever arm is provided with a support portion. A spring element interacts with the notches and is retained on the holder.

In order to attach the holder to the support bar, the holder is welded, riveted or screwed at distanced positions along the support bar. Generally, the support bar is made from a cold-hammered material. Thus, riveting or screwing is carried out, since the material is difficult to weld. The angle between the two support bar portions continuously following the bend is in the range between 160° and 165°. Thus, an advantageous orientation of the portions and therefore, an especially advantageous possibility for the approximation of the reaping system towards the ground is achieved. Additionally the face of the support bar facing away from the holder may include a reinforcement plate. The reinforcement plate has a bend corresponding to the support bar. The reinforcement plate can, at the same time, or together with the holding means, be connected to the support bar. In order to achieve the elastic bending of the support bar, the support bar is a flat material made from spring steel.

The attachment of the holder is simplified. The attachment portions are adapted, in the area of the provided attachment positions to the support bar, to the extension of the support bar. Thus, they are correspondingly bent to each other.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein:

FIG. 2 is in an enlarged side view of the support bar of the crop lifter and the arrangement of the holder to the support bar, as well as the arrangement relative to the reaping finger;

FIG. 3 is a sectional view of FIG. 2 along line III—III thereof;

FIG. 4 is a view like FIG. 2 of an alternative embodiment of the holder;

FIG. 5 is a sectional view of FIG. 4 along line V—V thereof;

FIG. 6 is a view like FIG. 2 of a further embodiment of the holder; and

FIG. 7 is a sectional view of FIG. 6 along line VII—VII thereof.

DETAILED DESCRIPTION OF THE PREFERRED EMBODIMENTS

Figure 1:
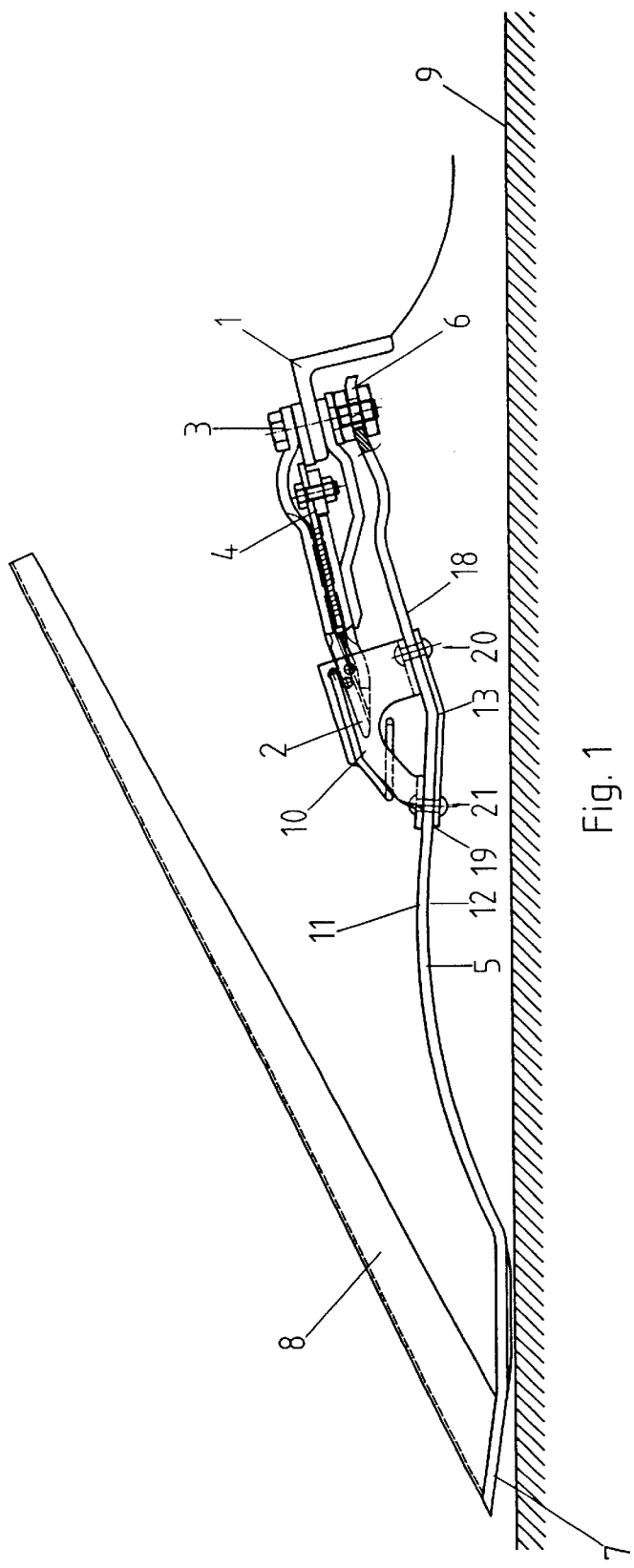
FIG. 1 is a side view of a crop lifter mounted to a cutter bed plate and a reaping finger of a harvesting machine reaping system.

The following description of the preferred embodiment(s) is merely exemplary in nature and is in no way intended to limit the invention, its application, or uses.

Turning to FIG. 1 a bed plate 1 is visible in a schematical representation. A reaping finger 2 projects from the bed plate 1. Reaping finger 2 is mounted, via a screw 3, on the bed plate 1. Further reaping fingers project into the drawing plane or projecting therefrom, are arranged at a desired distance between each other on the bed plate 1. The reaping fingers 2 guide a cutter bar 4 which has reaping blades for cutting the harvesting crop. The first end 6 of a support bar 5, made from a flat material, is attachable, via a fork-like formation and by a disc, with a ring groove by the screw 3 to the bed plate 1. At the second end 7 of the support bar 5, distanced from the first end 6, a grain lifter 8 is attached to the elastically bendable support bar 5. The grain lifter 8 extends at an angle to the support bar. The angle is inclined in the direction to the bed plate 1.

The support bar 5 is supported by a holder 10 on the reaping finger 2. The upper face of the holder 10 faces away from the support bar 5. A relative movement between the reaping finger 2 and support bar 5 is possible such that the face 11 of the support bar 5, facing the grain lifter 8, may be brought closer to the reaping finger 2. The holder 10 is connected at two distanced positions 20, 21 to the support bar 5 by rivets. A bend is in the intermediate area of the support bar 5, so that the two support bar portions 18, 19 enclose an obtuse angle. The angle opens in a direction towards the grain lifter 8.

The arrangement of the holder 10 in reference to the support bar 5 is described in more detail by means of the FIGS. 2 and 3. From these two figures it is visible, that the holder 10 has two legs 15, 16 which extend parallel to each other. The legs 15, 16 are connected to each other by attachment portions 35, 36. Both attachment portions 35, 36 are orientated corresponding to the extension of the two support bar portions 18, 19, at the angle 14.

A reinforcement plate 27 is arranged on the face 12 of the support bar 5 facing away from the grain lifter 8. The reinforcement plate 27 has a bend corresponding to the bend 13. The reinforcement plate 27 is connected to the support bar 5 at the support bar portions 18, 19, together with the attachment portions 35, 36 at the attachment positions 20, 21 via rivets 34.

The reaping finger 2 is received between the two legs 15, 16. The reaping finger tip 17 extends a desired distance with reference to the bed plate 1. The distance corresponds to the bend edge 13. Thus, the largest possible freedom of movement of the support bar portion 18 relative to the reaping finger 2 is achieved. Also, at the same time, the desired approximation to the ground is likewise achieved.

Bores are provided in the two legs 15, 16 to achieve different settings of the holder 10. Accordingly, different distances are achieved between the support bar 5 and the reaping finger 2. The bores are arranged in pairs 23, 24, 25 at the same distance from the grain lifter-sided face 11 of the support bar 5. A pin 26 can be inserted through the bore pairs 23, 24, 25. The pin 26 is supported on the face of the reaping finger 2 distanced from the support bar 5.

In FIGS. 4 and 5, and 6 and 7, respectively, alternative embodiments of the holders are represented. The components, which correspond to those in the embodiment according to FIGS. 1 to 3 are designated with reference numerals which are increased by the value 100 or 200 compared to the corresponding components of the embodiment according to FIGS. 1 to 3. A description is only given as to the different design. Otherwise, it is referred to the description for the embodiment according to FIGS. 1 to 3.

The holder 110 according to FIGS. 4 and 5 includes two legs 115, 116. The legs 115, 116 are connected to each other by a bridge portion 22. Thus, a support on the upper face of the reaping finger 2 facing away from the support bar 105 is achieved. An adjustment to different height positions is not possible. The travel of the spring and the relative movement of the support bar 105 towards the reaping finger 2, with reference to an approximation towards the reaping finger 2, is, however, achieved.

The embodiment according to FIGS. 6 and 7 illustrate a holder 210 which enables adjustment for different height positions of the support bar 205 relative to the reaping finger 2. An elbow lever 28 is pivotably supported between the two legs 215, 216 of the holder 210. A first lever arm 29 is provided with three notches 31. The notches 31 can selectively engage a through hole of a spring element 33. Thus, the elbow lever 28 is retained against displacement. The second lever arm 30 has a support portion 32. The support portion 32 is supported on the upper face of the reaping finger 2 facing away from the support bar 205.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A crop lifter for a harvesting machine reaping system with a bed plate with projecting fingers, comprising:

an elastically bendable support bar having a first end and a second end, the first end adapted to be coupled with the bed plate;

a grain lifter connected to the second end of the support bar;

a holder having legs coupled with the support bar facing toward the grain lifter, said holder adapted to receive a reaping finger extending between said legs, and holding means adapted for supporting the reaping finger in the direction toward the support bar, said support bar including a first portion extending substantially parallel to the reaping finger and a second portion angled from said first portion forming a bend in said support bar in the area in which said legs are coupled to said support bar, wherein said bend encloses an obtuse angle opening towards the grain lifter thereby moving the reaping fingers closer to the ground and enabling closer mowing to the ground.

2. The crop lifter according to claim 1, wherein the bend is provided in the extension range of the holder along the support bar.

3. The crop lifter according to claim 2, wherein the holder is connected at two attachment positions off-set along the support bar to the support bar and the bend is between the two attachment positions.

4. The crop lifter according to claim 3, wherein the attachment portions of the holder are bent in the area of the attachment positions to the support bar corresponding to the support bar.

5. The crop lifter according to claim 1, wherein the holding means is arranged to the holder for ensuring a support on the reaping finger at different positions relative to the support bar.

6. The crop lifter according to claim 5, where the holding means comprising pairs of bores arranged in the legs at different distances to the support bar and a pin insertable into the bores of the pairs of bores.

7. The crop lifter according to claim 5, wherein the holding means include an elbow lever pivotably supported between the legs, said elbow lever having a first lever arm with notches and a second lever arm with a support portion, and include a spring element interacting with the notches and attached to the holder.

8. The crop lifter according to claim 1, wherein the holding means comprising a bridge portion rigidly connecting the legs.

9. The crop lifter according to claim 1, wherein the holder is welded, riveted or screwed to the support bar along the support bar at distanced positions.

10. The crop lifter according to claim 1, wherein the angle is between 160° and 165°.

11. The crop lifter according to claim 1, wherein a reinforcement plate is arranged on a face of the support bar facing away from the grain lifter, which has a bend corresponding to the support bar.

12. The crop lifter according to claim 11, wherein the reinforcement plate is screwed or riveted together with the holder to the support bar.

13. The crop lifter according to claim 1, the support bar being a flat material made from a spring steel.

* * * * *